Jan. 18, 1927.  1,614,667
L. H. GILLICK
FLEXIBLE JOINT
Filed July 26, 1920   3 Sheets-Sheet 1
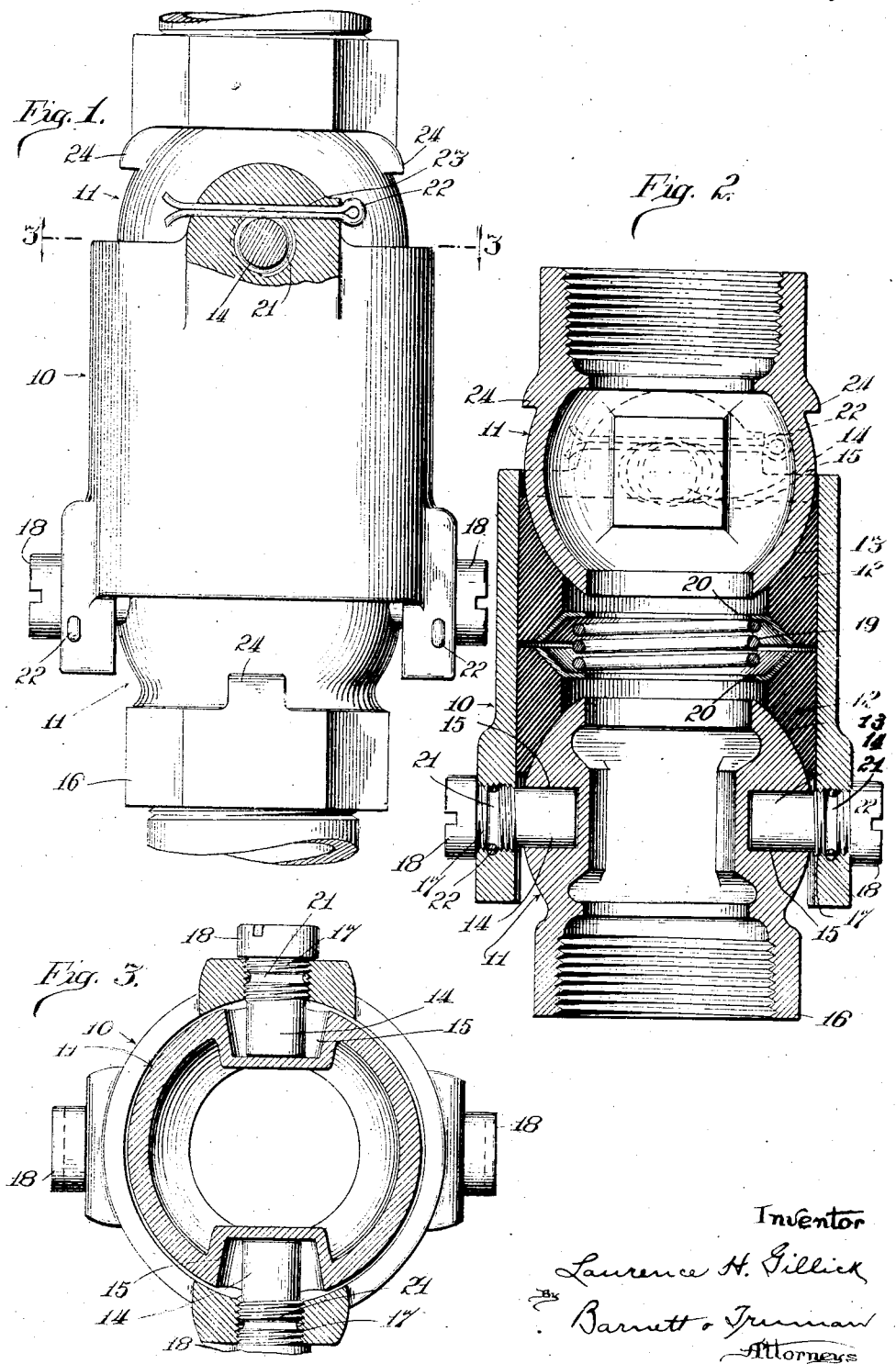
Inventor
Laurence H. Gillick
By Barnett & Truman
Attorneys

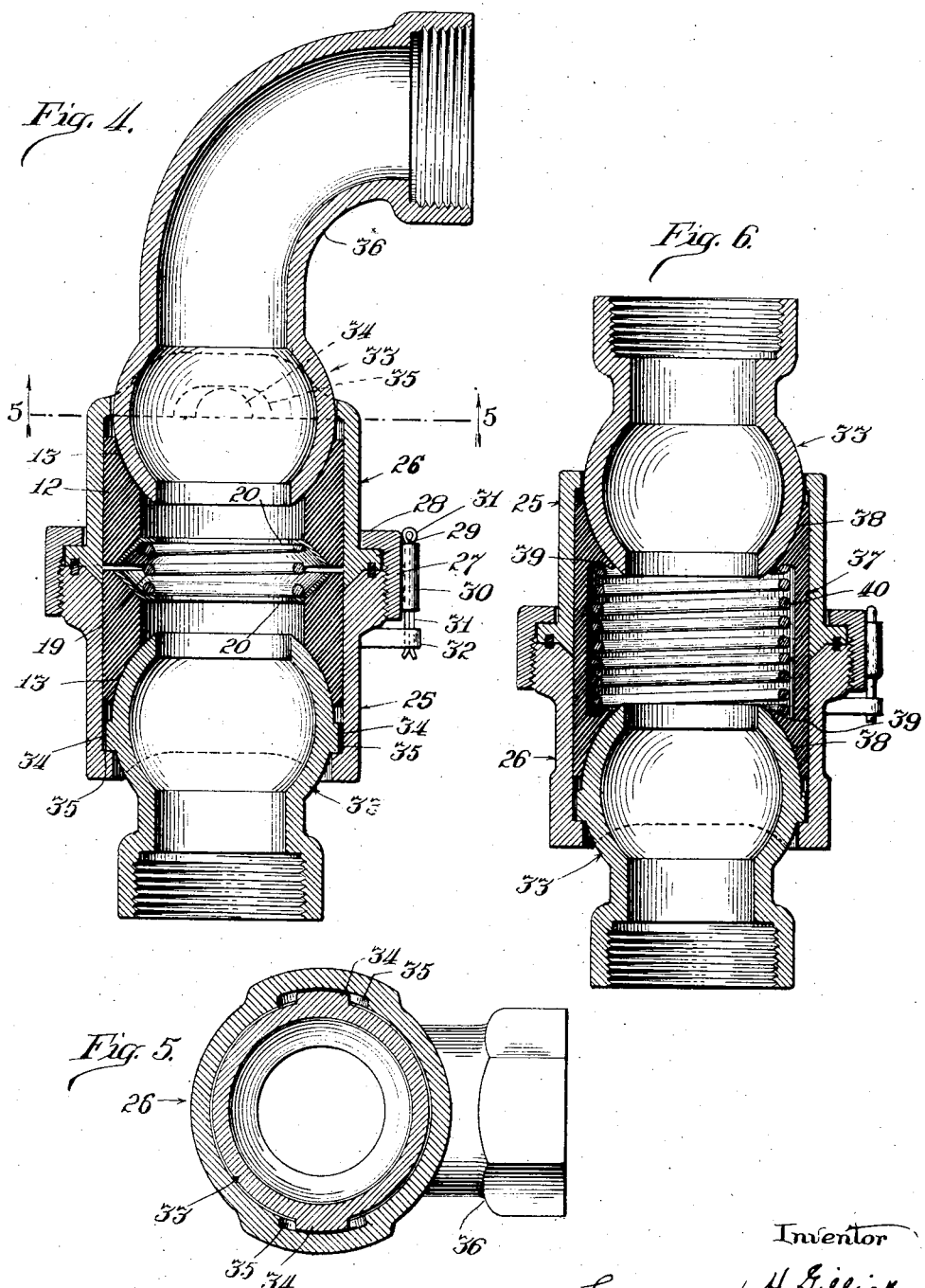

Jan. 18, 1927. 1,614,667
L. H. GILLICK
FLEXIBLE JOINT
Filed July 26, 1920  3 Sheets-Sheet 3
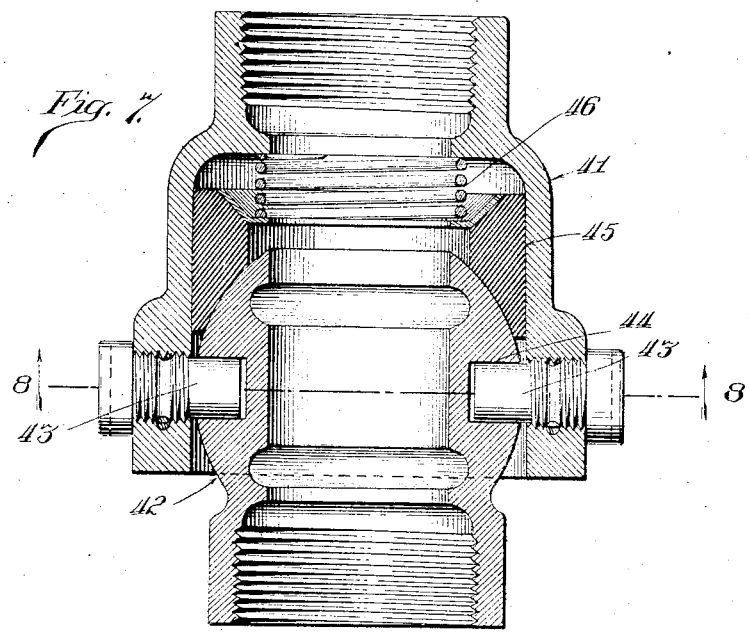
Inventor
Laurence H. Gillick
By Barnett + Truman
Attorneys Patented Jan. 18, 1927.

1,614,667

UNITED STATES PATENT OFFICE.

LAURENCE H. GILLICK, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE JOINT.

Application filed July 26, 1920. Serial No. 398,882.

My invention relates to a flexible coupling or pipe joint of the type employing ball and socket members, the joint being intended especially for conduits subject to rather high internal fluid pressures. The primary objects of the invention are: to provide a joint which will be flexible even when the fluid pressure therein is very high and will also be fluid tight and so remain after continued periods of service; to provide a joint that can be re-packed, when necessary, without breaking the conduit or pipe line with which the joint is associated; to provide a joint the members of which will have a wider range of angular movement than possessed by the usual so-called universal joints; to provide a simple arrangement whereby the members of the joint will have capacity for swivel movement, as between each other, as well as angular movement; to construct and dispose the parts of the joint so that the weight of the parts is not imposed on the packing whereby easy flexibility is insured and the packing has capacity for self adjustment under fluid or spring pressure, or both, against the ball member or members of the joint; and in other respects, to be hereinafter noted, to provide an improved flexible joint for use on railway trains, for example, in place of the usual rubber hose connecting the train pipe sections, or in other situations where lightness, compact structure, strength and flexibility over wide ranges are requisite.

The invention is illustrated, in certain preferred embodiments, in the accompanying drawings wherein—

Fig. 1 is a side elevation of a joint constructed in accordance with my invention.

Fig. 2 is a longitudinal section thereof.

Fig. 3 is a cross sectional view on line 3—3 of Fig. 1.

Fig. 4 is a longitudinal sectional view of a modified construction.

Fig. 5 is a cross sectional view on line 5—5 of Fig. 4.

Fig. 6 is a longitudinal sectional view of a joint utilizing a packing of different construction from that shown in the preceding figures.

Fig. 7 is a longitudinal sectional view of a joint employing a single ball member.

Fig. 8 is a cross sectional view on line 8—8 of Fig. 7, and

Fig. 9 is a fragmentary view in side elevation of a train line connection utilizing flexible joints constructed in accordance with the invention.

Like characters of reference designate like parts in the several figures of the drawings.

Referring first to Figs. 1, 2 and 3, the joint comprises a socket member 10 of cylindrical form internally, two ball or globular members 11, 11, and packing members or gaskets 12, 12, preferably of rubber composition which is soft and resilient relative to the metal parts of the device, or which soften under heat, as is the case with the rubber composition gasket in a steam train pipe joint as described, said gaskets being arranged within the socket member and having curved surfaces 13 bearing against the outer faces of the ball members. The ball members are flexibly connected with the socket members by means of pairs of studs 14, 14, (the axis of the studs of one connection being at right angles to the axis of those of the other,) which studs enter recesses 15 in the ball members, said recesses being elongated transversely with respect to the axis of the joint so as to permit a certain amount of swivel movement, as well as angular movement, between the ball members and the socket member. The ball members are formed with neck portions 16 of any suitable character for connecting the joint with the adjacent elements of the conduit of which the joint forms a part. The studs 14 are formed with threaded portions 17 and heads 18 and the openings in the socket member through which they extend are threaded to permit the studs to be withdrawn to disassemble the joint. This arrangement has the advantage that when the packing has to be renewed the annular gaskets may be taken out and new ones put in their place without disconnecting the ball members from the conduit elements to which they are attached. While fluid pressure, especially when the joint is used on a steam or air line, will ordinarily be sufficient to keep the gaskets in sealing contact with the ball members and the socket member (the gasket in each case extending a substantial distance inwardly from the ball to permit such sealing against the socket by radial expansion), I prefer to arrange a coiled spring 19 between the gaskets, the latter being preferably provided with annular discs 20 for the spring to bear against. The spring, moreover, keeps the gaskets in proper position when the joint is not subject to fluid pressure. The rings 20 are conical in form, with flanges for the ends of spring 19 and bear against correspondingly beveled interior faces on the ends of the gaskets so that the pressure of the spring not only forces the gaskets in the direction of their length against the ball members 11, 11 but also expands their inner ends against the socket member 10, thus insuring close contact between the gasket, in each case, and the ball and socket members. In order to prevent the studs 14 from backing out they are formed with annular grooves 21 and the grooved portions of the studs engaged by cotter pins 22 passing through bores 23 formed in the socket member. The ball members are preferably formed with stop shoulders 24 to engage the socket member.

With a joint so constructed the angular movement of each ball member with respect to the socket member may be considerable because the socket member does not directly engage the ball members (the engagement between them being made by the stud and recess connection) so that the portions of the socket member limiting the angular movements of the ball member need not project beyond, or even to, the line of maximum transverse diameter of the ball member.

The pivotal connections between the socket members and the ball members take the stress as between said members which results from the internal fluid pressure besides relieving the gaskets of the weight of the parts of the joint. This gives the joint easy flexibility even when the internal pressure is high, since the articulated parts, the ball and socket members, do not bear on each other, as is the case with the ordinary ball and socket joint, but are engaged by pivotal engagements which minimize friction. The packing is self seating or self adjusting against the surface of the ball members so that wear on the packing does not bring about a leaky condition of the joint.

In Figs. 4 and 5 I have shown a modified construction in which the socket member is made in two sections 25, 26, secured together by a union 27 screwed upon section 25 and having a flange 28 engaging a flange 29 on section 26, the union being provided with perforated, circumferentially arranged bosses 30 adapted to be engaged by cotter pins 31 with lugs 32 on section 25. The ball members 33 are formed with circular outstanding studs 34 adapted to project into transversely elongated recesses 35 formed in the socket members 25, 26. The gasket is formed as in Figs. 1, 2 and 3, the parts being correspondingly numbered. One of the ball members in this construction is shown as formed with an integral neck piece 36 having a right angle bend. The other ball member of this joint or the ball members of the construction previously described might also be formed in this way. Where the assembly of the joint in the conduit permits the ball members to have angular necks the construction is advantageous since a twisting force applied to the joint will not, in such case, tend to unscrew the joint from the pipe to which it is connected.

In Fig. 6 I have shown a single packing member which may be used in either of the constructions above described in place of the gaskets shown. This packing element 37 is annular in form and composed preferably of rubber or rubber composition. It is formed with two curved surfaces 38, 38 to bear against the outer surfaces of the ball members and with undercut grooves 39 in which are seated the ends of a coiled spring 40.

Fig. 7 illustrates the application of the principles of my invention to a joint employing a single ball member. 41 represents the socket member, 42 the ball member, 43 the removable studs which in this construction are shown as projecting into a groove 44 in the ball member which is in the form of a complete circle, permitting complete swivel movement as between ball and socket. This expedient might obviously be employed if desirable in the construction previously described. 45 is the gasket shown as held in place against the ball by a spring 46.

Fig. 9 illustrates one-half of an all-metal flexible pipe connection between the steam train pipes, for example, on a railroad train in which flexibility is obtained by using joints as shown in either Figs. 1, 2 and 3, or Figs. 4 and 5 hereof. A represents one of the train line sections, B the end valve associated therewith, C and D flexible joints constructed as hereinabove described, E a union connecting joint C with the end valve, F a straight metal pipe, connecting joints C and D, and G a short, curved pipe connecting joint D with the hose coupler H.

In referring to the ball member as being out of contact with the socket member I mean that there is no substantial contact, as is the case with the ordinary ball and socket joint in which the socket has a spherical surface in which the ball seats, thereby involving considerable friction between the parts when the joint is under pressure.

I claim:

1. In a flexible pipe joint, the combination of a socket member, a ball member extending into the socket member, a gasket interposed between the inner end of the ball member and the socket member, said gasket having a curved end surface to bear against the ball, the gasket and socket being formed so that as such end surface wears the gasket will slide freely in the socket to compensate for said wear, and means for supporting said ball member within the socket member, out of contact therewith and against lengthwise movement therein but with capacity for angular movements with respect thereto.

2. In a flexible pipe joint, a ball member, a socket member, means for holding said ball member within but spaced from the inner surface of the socket member, comprising pivotal connections to take the stress between said members caused by internal fluid pressure, and a gasket interposed between the inner end of the ball member and socket member, the interior surface of the socket member against which the gasket bears being cylindrical to allow the gasket to freely slide longitudinally thereon into the space between said members as the surface of the gasket bearing against the ball member wears.

3. In combination, two conduit structures to contain fluid under pressure, one comprising a globular member projecting into the other structure, said other structure comprising two elements one pivoted to the other and to said globular member on axes at right angles to each other, and an annular packing member arranged between the globular member and the conduit structure into which said member projects adapted to be thrust into the space between said members by the internal fluid pressure.

4. In a flexible pipe joint, a ball member, a socket member, means for holding said ball member within but spaced from the inner surface of the socket member, a gasket interposed between the inner end of the ball member and socket member, the interior surface of the socket member against which the gasket bears being cylindrical to allow the gasket to freely slide longitudinally thereon into the space between said members as the surface of the gasket bearing against the ball member wears, the end of the gasket remote from the ball being beveled on the inside of the gasket, a conical ring bearing against said beveled surface, and a spring to bear against said ring.

5. In a flexible pipe joint, a ball member, a socket member, means for holding said ball member within but spaced from the inner surface of the socket member, a gasket interposed between the inner end of the ball member and socket member, the interior surface of the socket member against which the gasket bears being cylindrical to allow the gasket to freely slide longitudinally thereon into the space between said members as the surface of the gasket bearing against the ball member wears, the end of the gasket remote from the ball being beveled on the inside of the gasket, a conical ring bearing against said beveled surface, provided with a flange at right angles to the axis of the joint, and a spring to bear against said flange.

6. In a flexible pipe joint, the combination of a ball member, a socket member, a packing in the socket bearing against the inner end of the ball member, and means connecting said members together which permits angular movement and also a swivel movement of one member with respect to the other, comprising diametrically arranged studs associated with one of the members and recesses in the other member to receive said studs.

7. In a flexible pipe joint, the combination of a ball member, a socket member, a packing in the socket bearing against the inner end of the ball member, and means connecting said members together which permits angular movement and also a swivel movement of one member with respect to the other, comprising diametrically arranged studs associated with one of the members and recesses in the other member to receive said studs, the recesses being elongated to allow swivel movement of the members with respect to each other.

8. In a flexible pipe joint, the combination of a ball member, a socket member, a packing in the socket bearing against the inner end of the ball member, and means connecting said members together comprising diametrically arranged removable studs associated with one of the members, and recesses in the other to receive said studs, said recesses being elongated to permit swivel movement of one member with respect to the other.

9. In a flexible pipe joint, the combination of a socket member having a cylindrical portion, a ball member extending into said socket member, a packing member in the socket member having a curved surface to bear against the ball member, a spring bearing against the packing member, the ball member being formed with recesses elongated transversely to the axis of the joint, and studs having threaded portions extending through the socket member, and smooth portions projecting into the recesses in the ball member.

10. In a flexible pipe joint, the combination of a socket member, ball members extending into opposite ends of the socket member, annular packing members in the socket member bearing against the inner ends of the ball elements respectively, and means providing pivotal connections, with axes at right angles, between the socket member and the ball members at opposite ends thereof.

11. In a flexible pipe joint, the combination of a socket member, ball members extending into opposite ends of the socket member, annular packing members in the socket member bearing against the ball elements respectively, means providing pivotal connections, with axes at right angles, between the socket member and the ball members at opposite ends thereof, and a spring interposed between said packing members.

12. In a flexible pipe joint, the combination of a socket member, ball members extending into opposite ends of the socket member, means in the socket member constituting packing bearing against the ball members, and means providing pivotal connections, with axes at right angles, between the socket member and the ball members at opposite ends thereof, which connections permit swivel movements as between the members connected thereby.

13. In a flexible pipe joint, the combination of a socket member, ball members extending into opposite ends of the socket member, means in the socket member constituting packing bearing against the ball members, and means providing pivotal connections, with axes at right angles, between the socket member and the ball members at opposite ends thereof, comprising, in each case, a stud associated with one member and a recess in the other member.

14. In a flexible pipe joint, the combination of a socket member, ball members extending into opposite ends of the socket member, means in the socket member constituting packing bearing against the ball members, and means providing pivotal connections, with axes at right angles, between the socket member and the ball members at opposite ends thereof, comprising, in each case, a stud associated with one member and a recess in the other member, said recesses being elongated to permit swivel movements as between the members of the joint.

15. In a flexible pipe joint, the combination of a socket member, ball members extending into opposite ends of the socket member, means in the socket member constituting packing bearing against the ball members, the ball members being formed with recesses, and studs having threaded engagement with the socket member and adapted to project into said recesses, the recesses being elongated to permit swivel movement as between the parts of the joint.

16. In a flexible pipe joint, the combination of a socket member, ball members extending into opposite ends of the socket member, means in the socket member constituting packing bearing against the ball members, the ball members being formed with recesses, and studs having threaded engagement with the socket member and adapted to project into said recesses, the axis of the studs connecting one ball member to the socket member being at right angles to the axis of the studs connecting the other ball member.

17. In a flexible pipe joint, the combination of a cylindrical socket member, ball members projecting into the ends of the socket member and formed with recesses elongated with respect to the axis of the joint, studs having threaded connections with the socket member and adapted to project into said recesses, the studs at one end of the joint being at right angles to those at the other end, packing rings in the socket member having curved surfaces to bear against said ball members respectively, and a spring interposed between said packing members.

18. In a flexible pipe joint, the combination of a socket member, a ball member extending into the socket member, a gasket subject to fluid pressure in said joint, interposed between the inner end of the ball member and the socket member, the outer end of which gasket has a curved surface to bear against the ball and the inner end of which extends a substantial distance from the ball member and along the socket member so as to be radially expansible against the socket member, said gasket and socket being formed so that as said end surface of the gasket wears the gasket will freely slide in the socket to compensate for said wear, and means for supporting said ball member within the socket member, out of contact therewith and against lengthwise movement therein but with capacity for angular movements with respect thereto.

19. In a flexible pipe joint, a ball member, a socket member having an interior cylindrical surface, a gasket interposed between the inner end of the ball member and the socket member having a concave surface to fit the ball and formed so that it is slidable on said interior cylindrical surface of the socket member into the space between said members as said concave surface wears, a conical wedging member in the end of the gasket remote from the ball, and a spring to bear against said member so as to exert a force on the gasket tending to move the same longitudinally and to expand the same against said socket member.

20. In a flexible pipe joint, a ball member, a socket member having an interior cylindrical surface, a gasket interposed between the inner end of the ball member and the socket member having a concave surface to fit the ball and formed so that it is slidable on said interior cylindrical surface of the socket member into the space between said members as said concave surface wears, the end of the gasket remote from the ball being beveled on the inside of the gasket, a conical ring engaging said beveled surface and provided with a flange, and a spring to bear against said flange.

21. In a flexible pipe joint, the combination of a socket member, a ball member extending into the socket member, a gasket interposed between the inner end of the ball member and the socket member, said gasket having a curved end surface to bear against the ball, the gasket and socket being formed so that as such end surface wears the gasket will slide freely in the socket to compensate for said wear, means for supporting said ball member within the socket member, out of contact therewith and against lengthwise movement therein but with capacity for angular movements with respect thereto, and a spring for forcing the gasket toward the ball member.

22. In a flexible pipe joint, the combination of an interiorly cylindrical socket member, a ball member extending into the socket member, a plurality of pivotal articulations for supporting said ball member within and out of contact with the socket member, and an exteriorly cylindrical gasket interposed between the inner end of the ball member and socket member, having a curved surface bearing against the ball with its other end extending inwardly a substantial distance from the ball so as to be expansible on fluid pressure radially against the socket member.

23. In a flexible pipe joint, the combination of a ball member, an interiorly cylindrical socket member, means for holding the ball member in said socket member, flexibly, and out of contact with the socket member, an interiorly cylindrical gasket to fit the socket member and spherically curved, interiorly, at one end to bear against the inner portion of the ball member, and means for forcing said gasket outwardly toward the ball member and expanding the same radially against the socket member.

24. In a flexible pipe joint, the combination of a ball member, an interiorly cylindrical socket member, an exteriorly cylindrical gasket to fit the socket member, spherically curved, interiorly, at one end to bear against the inner portion of the ball member and beveled interiorly at the other end, and a spring device to act against said beveled surface for forcing said gasket outwardly toward the ball member and expanding the same radially against the socket member.

25. In flexible pipe joint, the combination of a socket member, a ball member extending into the socket member, a gasket subject to fluid pressure in said joint, interposed between the inner end of the ball member and the socket member, having a curved surface to bear against the ball and extending inwardly from the ball for a distance substantially as great as the length of the gasket in contact with the ball so that the inner end of the gasket is expanded radially against the socket member by internal fluid pressure, said gasket and socket being formed so that as said curved surface of the gasket wears the gasket will freely slide in the socket to compensate for said wear.

26. A flexible joint comprising a socket member, a ball member extending into said socket but out of contact therewith, studs fixed to one of the members and projecting radially of the ball, the other member being provided with spaced opposing surfaces between which the studs are confined to prevent bodily movement of the ball into or out of the socket, but permit swinging and rotational movements of the ball member with respect to the socket, a gasket slidably mounted in said socket and having a concaved bearing portion shaped to fit snugly the inner end of the ball member, and a spring applying pressure to said gasket for pressing it longitudinally into contact with the ball member and radially into contact with the socket member.

LAURENCE H. GILLICK.